United States Patent
Niedermeier (10) Patent No.: US 12,209,969 B2
(45) Date of Patent: Jan. 28, 2025

(54) METHOD AND DEVICE FOR OPTICALLY INSPECTING CONTAINERS

(71) Applicant: KRONES AG, Neutraubling (DE)

(72) Inventor: Anton Niedermeier, Offenstetten (DE)

(73) Assignee: KRONES AG, Neutraubling (DE)

( * ) Notice: Subject to any disclaimer, the term of this patent is extended or adjusted under 35 U.S.C. 154(b) by 524 days.

(21) Appl. No.: 17/596,084

(22) PCT Filed: Mar. 6, 2020

(86) PCT No.: PCT/EP2020/056009
§ 371 (c)(1),
(2) Date: Dec. 2, 2021

(87) PCT Pub. No.: WO2020/244817
PCT Pub. Date: Dec. 10, 2020

(65) Prior Publication Data
US 2022/0317054 A1    Oct. 6, 2022

(30) Foreign Application Priority Data
Jun. 6, 2019  (DE) .................... 10 2019 208 295.5

(51) Int. Cl.
*G01N 21/88* (2006.01)
*G01N 21/90* (2006.01)

(52) U.S. Cl.
CPC ......... *G01N 21/8806* (2013.01); *G01N 21/90* (2013.01); *G01N 21/9018* (2013.01); *G01N 2021/8845* (2013.01)

(58) Field of Classification Search
None
See application file for complete search history.

(56) References Cited

U.S. PATENT DOCUMENTS

| | | | |
|---|---|---|---|
| 6,304,323 | B1 | 10/2001 | Ishikura et al. |
| 2008/0310701 | A1 | 12/2008 | Caroli et al. |

(Continued)

FOREIGN PATENT DOCUMENTS

| | | |
|---|---|---|
| DE | 102014220598 A1 | 4/2016 |
| DE | 102017008406 A1 | 3/2019 |

(Continued)

OTHER PUBLICATIONS

ISA European Patent Office, International Search Report Issued in Application No. PCT/EP2020/056009, Jul. 3, 2020, WIPO, 5 pages.

*Primary Examiner* — Rebecca A Volentine
(74) *Attorney, Agent, or Firm* — McCoy Russell LLP (57) ABSTRACT

Method for optically inspecting containers, where the containers are transported to an inspection unit with an illumination unit and with a camera, where light emitted from a planar light-emitting surface of the illumination unit is transmitted or reflected via said containers, where the camera records in at least one camera image at least one of the respective containers and the light transmitted or reflected via them, where the light emitted from the light-emitting surface is locally encoded on the basis of a wavelength property and is recorded by the camera in such a way that different emission locations of the light-emitting surface can be distinguished from one another in the at least one camera image, and that the image processing unit evaluates the at least one camera image for location information of the emission locations, in order to distinguish the defects from the foreign objects.

12 Claims, 5 Drawing Sheets

(56) References Cited

U.S. PATENT DOCUMENTS

| | | | |
|---|---|---|---|
| 2011/0140010 A1* | 6/2011 | Akkerman | G01N 21/9018 |
| | | | 250/553 |
| 2013/0215261 A1 | 8/2013 | Rahmani et al. | |
| 2016/0007020 A1 | 1/2016 | Yang et al. | |
| 2018/0156740 A1 | 6/2018 | Sones et al. | |
| 2021/0088454 A1* | 3/2021 | Heuft | G01V 5/22 |

FOREIGN PATENT DOCUMENTS

| | | | |
|---|---|---|---|
| EP | 0472881 | A2 | 3/1992 |
| EP | 0926486 | A2 | 6/1999 |

* cited by examiner

METHOD AND DEVICE FOR OPTICALLY INSPECTING CONTAINERS

CROSS REFERENCE TO RELATED APPLICATIONS

The present application is a U.S. National Phase of International Application No. PCT/EP2020/056009 entitled "METHOD AND DEVICE FOR OPTICALLY INSPECTING CONTAINERS," and filed on Mar. 6, 2020. International Application No. PCT/EP2020/056009 claims priority to German Patent Application No. 10 2019 208 295.5 filed on Jun. 6, 2019. The entire contents of each of the above-listed applications are hereby incorporated by reference for all purposes.

TECHNICAL FIELD

The disclosure relates to a method and a device for optically inspecting containers.

BACKGROUND AND SUMMARY

Such methods and devices are typically used to inspect the containers for foreign objects and/or defects. For this purpose, the containers are transported to an inspection unit with an illumination unit and with a camera so that they can be inspected in transmitted light or in incident light. Where the illumination unit emits light from a planar light-emitting surface, which light is transmitted or reflected via the containers and is then recorded with the camera as at least one camera image. The at least one camera image is then evaluated with an image processing unit for intensity information in order to detect the foreign objects and/or defects of the containers.

For example, such methods and devices are used for side wall, base, and/or filling level inspection of empty containers or containers that have already been filled with a product.

For the detection of foreign objects, the containers are typically inspected with a diffusely emitting light-emitting surface in order to suppress, for example, glass embossing or water droplets in the camera image. The foreign objects can be, for example, soiling, product residues, residues of labels or the like.

In contrast, a directionally emitting light-emitting surface is used to detect defects in order to thus enhance the light refraction that arises in the camera image. Defects can be, for example, damage to the containers, such as chipped glass. It is also conceivable that they are incorrectly produced material spots, such as, for example, local material thickenings.

As a result, two different inspection units with different emission characteristics of the illumination units are typically used in order to be able to detect foreign objects and defects equally well.

The drawback there is that this requires corresponding costs and installation space for optically inspecting the container.

A method for detecting defects in glass articles and a device suitable for this are known from US 2013/0215261 A1. In order to increase the contrast, illumination with several light patterns that are shifted relative to one another is proposed there.

DE 10 2014 220 598 A1 discloses an inspection device for transmitted light inspection of containers with a device for subdividing the light-emitting surface into at least two predominantly horizontally separated partial regions which can be optionally switched on and off for side wall inspection and/or closure head inspection of the container.

U.S. Pat. No. 6,304,323 B1 discloses a method for detecting defects in bottles.

EP 0 472 881 A2 discloses a system and a method for optically inspecting the base regions of transparent containers.

US 2008/0310701 A1 discloses a method and a device for the visual inspection of an object.

EP 0 926 486 B1 discloses a method for optically inspecting transparent containers using infrared and polarized visible light.

DE 10 2017 008 406 A1 discloses an inspection device with colored illumination for inspecting containers for soiling and three-dimensional container structures. For this purpose, an emission source comprises several spatially separated emission zones which emit radiation in different wavelength ranges or with different intensities. Decorative elements then cause a local color contrast, while soiling causes only a local brightness contrast and no local color contrast.

However, in the case of particularly small defects or defects with little curvature, it is often not possible to detect and reliably evaluate the local color contrast.

The object of the present disclosure is to provide a method and a device for optically inspecting containers with which foreign objects as well as defects can be detected with less effort and which require less installation space.

To satisfy the object, the disclosure provides a method for optically inspecting containers.

Extensive investigations by the applicant have shown that the light is refracted differently at the defects than at intact areas of the container due to the associated local change in the container surface. As a result, the light is deflected via the defect from a different emission location of the light-emitting surface towards the camera than from the intact areas. Conversely, this is often less or not at all the case with foreign objects, since, for example, soiling leads to local absorption of the light without then significantly influencing the light path to the camera.

Due to the light emitted by the light-emitting surface being locally encoded on the basis of the wavelength property and recorded by the camera, it is possible to determine for the image points of the camera image from which of the emission locations the corresponding light component originates, regardless of the emission characteristics of the light-emitting surface. Due to the fact that the image processing unit evaluates the at least one camera image for location information of the emission locations, a defect can be distinguished from a foreign object, for example, on the basis of a local change in the emission location. Conversely, the intensity information can still be evaluated in order to detect the absorption of the light by foreign objects particularly well with an emission characteristic of the light-emitting surface that is as diffuse as possible. Consequently, it is possible with the method according to the disclosure to detect foreign objects as well as defects with a single inspection unit. Less installation space is required because this is done with a single inspection unit.

The method for the optical inspection can be used in a beverage processing system. The method can be disposed upstream or downstream of a container production process, a cleaning process, a filling and/or closing process. The method can be used in a full bottle or empty bottle inspection machine. For example, the method can be used to inspect returnable containers that have been returned.

The containers can be provided to hold beverages, food, hygiene articles, pastes, chemical, biological and/or pharmaceutical products. The containers can be configured as bottles, in particular as plastic bottles or glass bottles. Plastic bottles can be in particular PET, PEN, HD-PE, or PP bottles. They can also be biodegradable containers or bottles, the main components of which are made from renewable raw materials such as sugar cane, wheat, or corn. The containers can be provided with a closure, for example, with a crown cap, a screw closure, a tear-off closure or the like. The containers can also be present as empties without a closure.

It is conceivable that the method is used to examine the side wall, base, mouth and/or content of the containers. The foreign objects can be, for example, soiling, product residues, residues of labels, and/or the like. Defects can be, for example, damage to the containers, such as chipped glass. It is also conceivable that they have incorrectly produced material spots, such as, for example, local material thickenings or material tapers.

The containers can be transported as a flow of containers by a conveyor to the inspection unit. The conveyor can comprise a carousel and/or a linear conveyor. It is conceivable, for example, that the conveyor comprises a conveyor belt on which the containers are transported standing upright to a region between the illumination unit and the camera. Vessels that hold one or more containers during transport (PUK) are conceivable. The container can also be transported held by lateral straps when e.g. the illumination transilluminates the container base and the camera inspects the base through the container mouth opening.

The illumination unit can generate the light using at least one light source, for example, using a light bulb, a fluorescent tube, or using at least one LED. The light can be generated with a matrix of LEDs and emitted in the direction of the light-emitting surface. The light-emitting surface can be formed to be larger than the camera view onto the container. It is also conceivable that the light-emitting surface only illuminates part of the camera view onto the container. The light-emitting surface can emit the light in part or completely in a diffused manner. The light-emitting surface can comprise a diffusion disk with which the light from the at least one light source is diffusely scattered over a large area towards the camera. An emission location can presently mean a local point or a planar section of the light-emitting surface.

The camera can record with an objective and with an image sensor the at least one of the containers and the light transmitted or reflected via them. The image sensor can be, for example, a CMOS or a CCD sensor It is conceivable that the camera transmits the at least one camera image with a data interface to the image processing unit. It is conceivable that the light is generated by the illumination unit, then transilluminates the container, and is then recorded by the camera. The camera can separate the wavelength property of the transmitted or reflected light recorded for each pixel of the at least one camera image.

The image processing unit can process the at least one camera image using a signal processor and/or using a CPU and/or GPU. It is also conceivable that the image processing unit for this purpose comprises a storage unit, one or more data interfaces, for example, a network interface, a display unit, and/or an input unit. It is conceivable that the image processing unit evaluates the at least one camera image using image processing algorithms that are present as a computer program product in the storage unit.

"That the light emitted from the light-emitting surface is locally encoded on the basis of a wavelength property and is recorded by the camera in such a way that different emission locations on the light-emitting surface can be distinguished from one another in the at least one camera image" can presently mean that the light is emitted from the light-emitting surface with the wavelength property varying locally so that the various emission locations are each encoded differently with the wavelength property, where the camera records in the at least one camera image the locally varying wavelength property as the location information.

It is conceivable that the local encoding of the emitted light is adapted to a task, in particular to a type of container, on the basis of the wavelength property. For example, the boundaries of the locally encoded light can be adapted to a container height and/or width. In other words, the area of the light-emitting surface that varies with the wavelength can be enlarged or reduced. For example, multicolored LEDs can be controlled differently depending on the task at issue. Alternatively, a first color gradient filter can be exchanged for a second color gradient filter, in particular in an automated or manual manner.

It is conceivable that the image processing unit evaluates the at least one camera image for location information of the emission locations in order to additionally detect local material embossments, such as embossing, glass embossments, pearls and the like on the containers and/or to distinguish them from the foreign objects. Such material embossments can be used, for example, as decorative elements. The image processing unit can evaluate the at least one camera image for intensity information and location information of the emission locations in order to detect areas with changed location information and changed intensity information as being the container edge. Since there is dimming as well as a particularly large deflection of the light beams at the container edge, the container edge can thus be detected particularly easily. For example, in that the image processing unit evaluates the at least one camera image for a third local area with intensity information and different location information that differ from the surroundings in order to infer the presence of the container edge.

The wavelength property of the emitted light for local encoding can change continuously along at least one direction of the light-emitting surface. This enables particularly high-resolution local encoding so that even particularly small defects and defects with little curvature can be distinguished from the foreign objects. In other words, the emission locations of the light-emitting surface can transition continuously into one another so that the wavelength property changes continuously over the light-emitting surface. The at least one direction of the light emission disk can be disposed in the plane of the light emission disk. It is conceivable that the light emission disk comprises a rectangular border, where the at least one direction runs collinear to at least one straight edge of the border.

A wavelength property can presently mean, for example, a color property of light It is conceivable that the light-emitting surface emits the light from the various emission locations with different wavelengths or colors. For example, a filter with a continuously changing filter profile or several discrete filter sections can be arranged in the area of the light-emitting surface so that the wavelength of the emitted light changes locally. It is also conceivable that the different wavelengths are emitted by respectively different light sources, in particular LEDs. The light can be emitted in the visible range and/or in the non-visible range of the wavelength spectrum. For example, the light can be perceptible to the human eye in the visible range and/or be disposed in a wavelength range from 380 nm to 750 nm. The non-visible range can be imperceptible to the human eye and/or be disposed in the UV or IR wavelength range. It is also conceivable that the visible range is combined with the non-visible range. For example, in the case of containers made of amber glass, the light-emitting surface could be encoded with red and infrared light wavelengths. The camera can separate the wavelength property in the at least one camera image. For example, a color camera can be used with which the different colors are recorded in at least two, in particular three color channels. For example, the color camera can comprise a Bayer filter to separate the colors.

It is also conceivable that the light emitted by the light-emitting surface is encoded with a polarization property in addition to the wavelength property. As a result, the light emitted can be locally encoded with the wavelength as well as with the polarization. The camera can then separate the color property as well as the polarization property in the at least one camera image. The polarization property can presently mean that the light is emitted from the different emission locations of the light-emitting surface with respective different polarization directions. For example, a polarization filter with a continuously changing polarization profile or several polarization filters with different orientations can be arranged in the area of the light-emitting surface so that the polarization of the light emitted changes locally. It is conceivable that the camera separates the polarization property in the at least one camera image. For this purpose, it can comprise, for example, several image sensors, each with a differently oriented polarization filter, or a single image sensor with a polarization filter matrix. For example, for this purpose the camera can comprise a Sony IMX250MZR or IMX250MYR type sensor.

The image processing unit can evaluate the at least one camera image for a first local area with intensity information that differs from that of the surroundings in order to infer the presence of a foreign object. Due to the reason that defects typically absorb light, they can be identified particularly easily by way of the differing intensity information in the at least one camera image.

The image processing unit can evaluate the at least one camera image for a second local area with location information that differs from that of the surroundings in order infer the presence of a foreign object. Due to the fact that the defect of the container deflects the light differently than the areas surrounding the defect, the latter can be detected particularly easily in this way in the at least one camera image. For example, the defect in the at least one camera image can have a different color than its surroundings. This then suggests a different refraction of light than in the surroundings and thereby the defect.

The at least one camera image can be separated into an intensity channel and a color channel using the image processing unit, where the image processing unit detects the foreign objects on the basis of the intensity channel and the defects on the basis of the color channel. As a result, the foreign objects and the defects in the two channels can be evaluated separately in a particularly simple manner. For example, the wavelength property can be a color property. For example, the at least one camera image can be transformed into the HSV color space using known methods, where the H channel corresponds to the color channel and the V channel corresponds to the intensity channel. An intensity channel can presently mean a channel for a relative brightness, an absolute brightness, or for an intensity.

To satisfy the object, the disclosure furthermore provides a device for optically inspecting containers.

Due to the illumination unit being configured to emit in a locally encoded manner on the basis of the wavelength property the light that is emitted from the light-emitting surface, and due to the camera being configured to record the locally encoded light, it can be determined for the respective image points of the camera image from which of the emission locations the corresponding light component originates, regardless of the emission characteristics of the light-emitting surface. Due to the image processing unit being configured to evaluate the at least one camera image for location information of the emission locations, a defect can be distinguished from a foreign object on the basis of a local change in the emission location. Conversely, the intensity information can still be evaluated in order to detect the absorption of the light by foreign objects particularly well with an emission characteristic of the light-emitting surface that is as diffuse as possible. Consequently, it is possible with the device according to the disclosure to detect foreign objects as well as defects equally well with a single inspection unit. Less installation space is then required because this is done with a single inspection unit.

The device for optically inspecting containers can be configured to carry out the method. The device can accordingly comprise the features described above.

The device for optical inspection can be arranged in a beverage processing system. The beverage processing system can comprise container treatment machines, in particular a container manufacturing machine, a rinser, a filler, a closer, a labeling machine, a direct printing machine, and/or a packaging machine. It is conceivable that the device for inspection is associated with one of the container treatment machines mentioned. The device can be used for full or empty bottle inspection. It is conceivable, for example, that the device is used to inspect returnable containers that have been returned.

The illumination unit is configured in such a way that the wavelength property of the emitted light for local encoding changes continuously along at least one direction of the light-emitting surface. This enables particularly high-resolution local encoding so that even particularly small defects and defects with a complex geometry can be distinguished from the foreign objects.

The illumination unit can be configured to emit the light with the wavelength property differing in dependence of the location. Accordingly, the camera can be configured to record the wavelength property in a spatially resolved manner. For example, the illumination unit can comprise a gradient filter for the different wavelength properties and the camera a Bayer filter for color separation. As a result, the different emission locations of the light-emitting surface can be encoded particularly easily by use of colors. As described above with reference to the method, this can also be done with a polarization filter for additionally recording the polarization property of the light in addition to the wavelength property.

The camera can be configured as a color camera. As a result, the wavelength property can be recorded spatially resolved with little effort. The color camera can comprise a Bayer filter for separating the colors.

It is conceivable that the illumination unit comprises a white light source and a color gradient filter for emitting the light from the light-emitting surface in a locally encoded manner. The gradient filter can be a filter that is transparent for different colors along at least one direction of the filter.

It is also conceivable that the illumination unit comprises several different light sources, in particular LEDs, which emit light spectra that differ from one another for emitting the light from the light-emitting surface in a locally encoded manner. As a result, the light can be generated particularly efficiently with the illumination unit. For example, the illumination unit can comprise several rows of LEDs that are adjacent to one another, where the rows of LEDs emit light spectra that differ from one another, and where each row of LEDs emits LEDs having the same light spectrum. Due to the fact that the light from adjacent rows of LEDs mixes, in particular through a diffuser, the wavelength property of the emitted light can change continuously along the at least one direction of the light-emitting surface.

BRIEF DESCRIPTION OF THE FIGURES

Further features of the disclosure shall be explained in more detail hereafter with reference to the embodiments shown in the figures, where.

DETAILED DESCRIPTION

Figure 1:
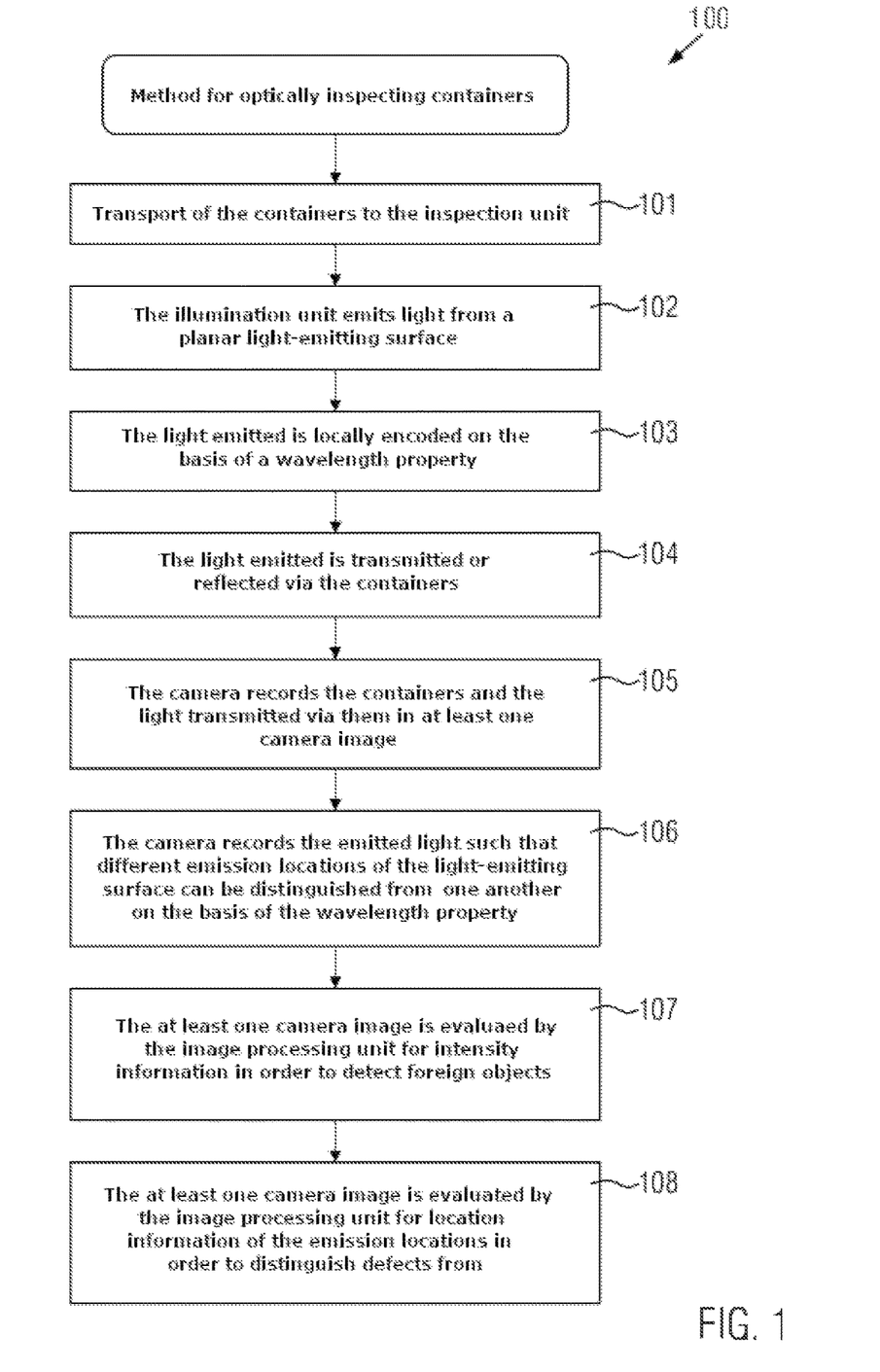
FIG. 1 shows an embodiment according to the disclosure of a method for optically inspecting containers as a flow chart.
Figure 2:
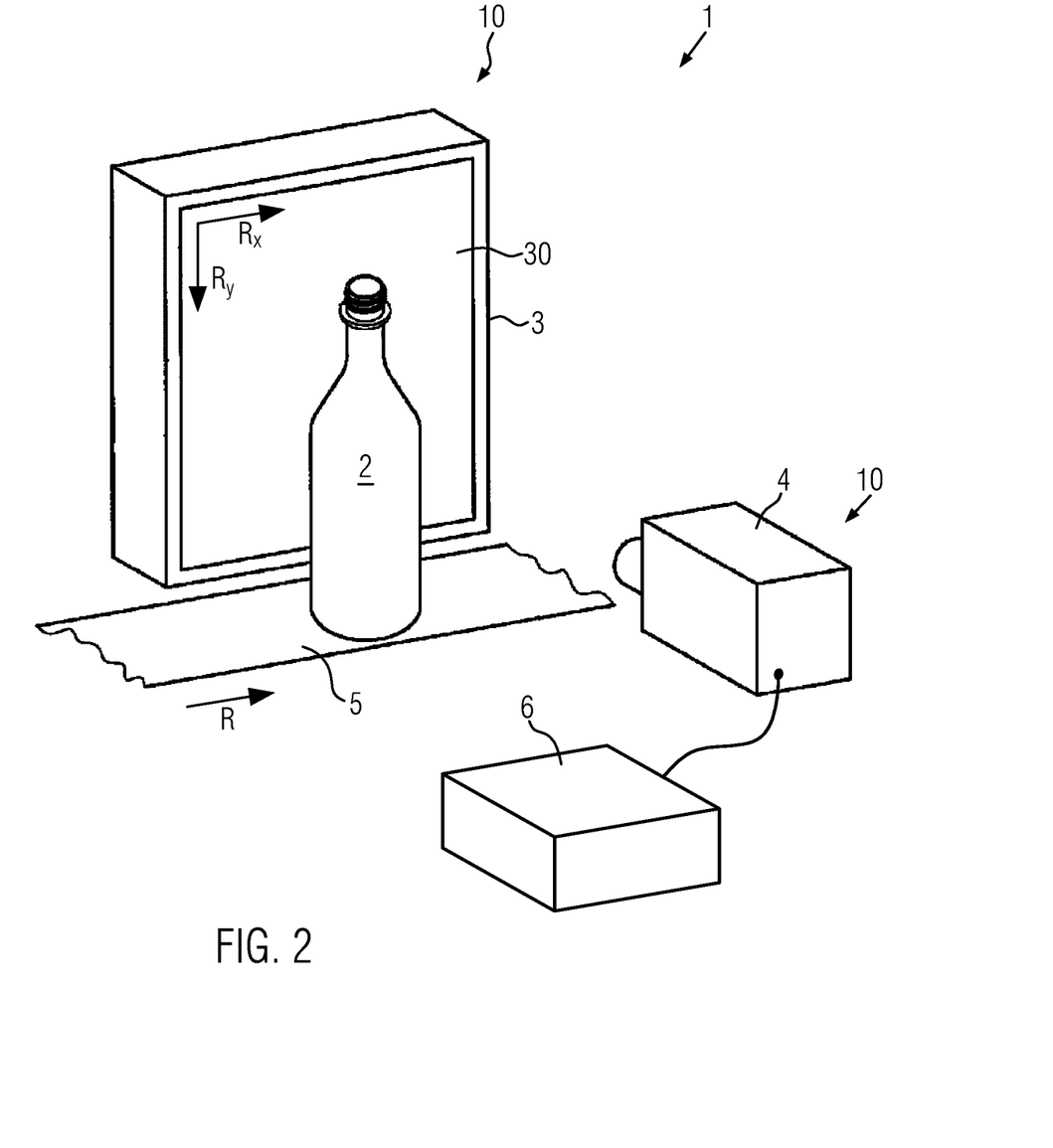
FIG. 2 shows an embodiment according to the disclosure of a device for optically inspecting containers as a perspective view.

FIG. 1 shows an embodiment according to the disclosure of a method 100 for inspecting containers 2 as a flow chart. Method 100 shall be explained in more detail with reference to FIGS. 2-5C:

FIG. 2 shows an embodiment according to the disclosure of a device 1 for optically inspecting containers 2 as a perspective view; Inspection unit 10 can be seen with illumination unit 3 and with camera 4. Arranged between the two is conveyor 5 which is presently configured merely by way of example as a conveyor belt on which containers 2 are transported (step 101) in direction R between illumination unit 3 and camera 4. Only a single container 2 which is currently being inspected is shown by way of example. Nevertheless, containers 2 are transported on conveyor 5 as a flow of containers and are each optically inspected between illumination unit 3 and camera 4.

The illumination unit emits light from planar light-emitting surface 30 for transilluminating (step 102) containers 2. The light emitted is transmitted (step 104) via containers 2 to camera 4. It is also conceivable that the arrangement of illumination unit 3 opposite camera 4 means that the light is reflected via containers 2. Camera 4 is arranged at inspection unit 10 such that it records (step 105) in at least one camera image containers 2 and light transmitted via them.

Illumination unit 3 can comprise, for example, a matrix of LEDs which emit light onto light-emitting surface 30. For example, light-emitting surface 30 can be configured as a diffusion disk for emitting the light of the LEDs as diffusely as possible. In addition, illumination unit 3 emits (step 103) the light from light-emitting surface 30 in a locally encoded manner on the basis of a wavelength property. This shall be explained in more detail hereafter with reference to the embodiments in FIGS. 3-5C. Accordingly, camera 4 is configured to record the locally encoded light so that different emission locations of light-emitting surface 30 can be distinguished (step 106) from one another in the at least one camera image.

Furthermore, image processing unit 6 can be seen with which the at least one camera image is evaluated for intensity information in order to detect (step 107) foreign objects and/or defects of the containers. This can be done, for example, with image processing algorithms known per se for detecting local changes in the at least one camera image.

In addition, image processing unit 6 evaluates the at least one camera image for location information of the emission locations in order to distinguish (step 108) the defects from the foreign objects.

Figure 3:
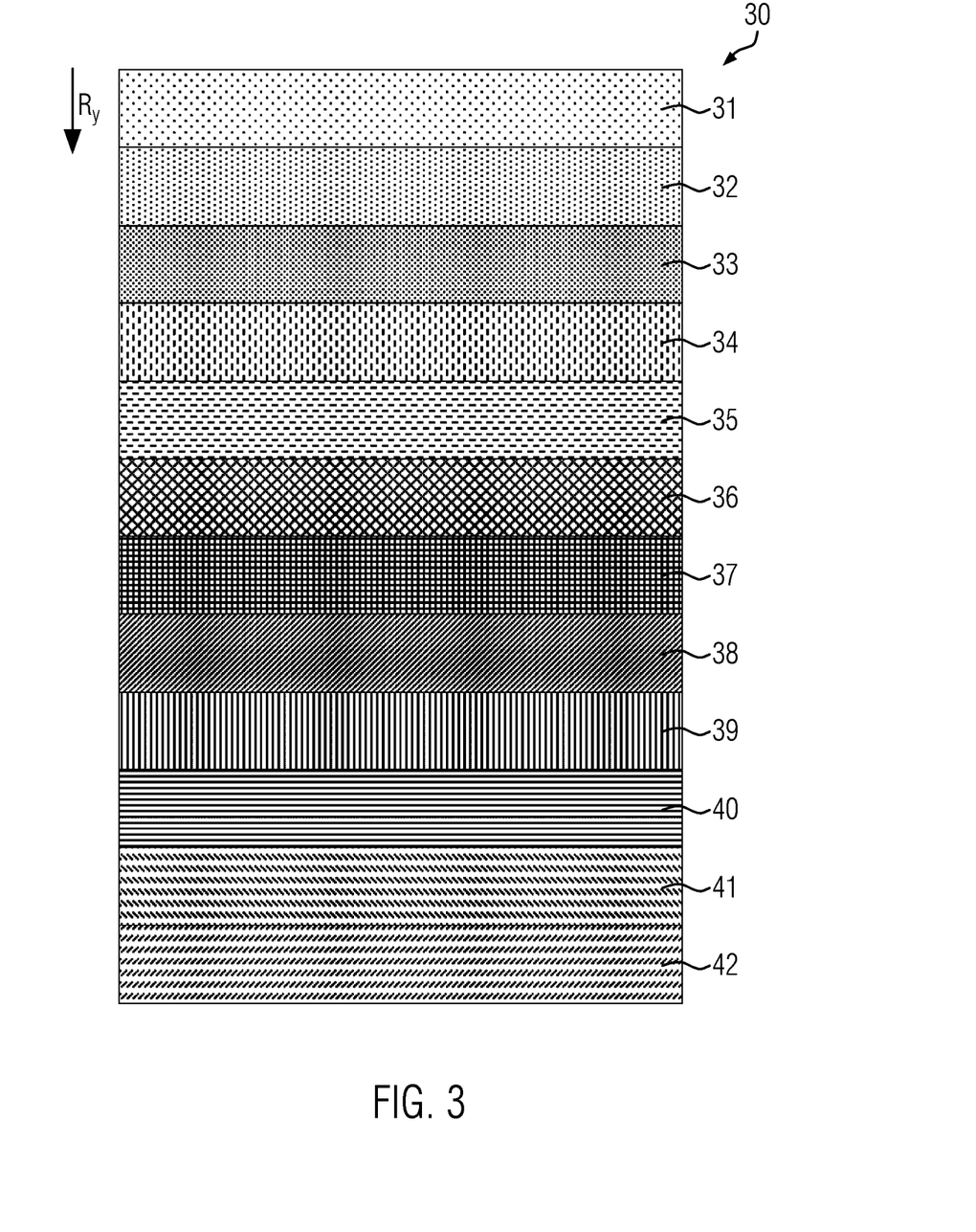
FIG. 3 shows a detailed view of the light-emitting surface of the illumination unit from FIG. 2.

Method 100 and device 1 shall be explained in more detail hereafter with reference to FIGS. 3-5C:

FIG. 3 shows a detailed view of light-emitting surface 30 from FIG. 2. Various emission locations 31-42 of light-emitting surface 30, which are locally encoded on the basis of the wavelength property, can be seen in detail.

As a result, various emission locations 31-42 each emit light with a different wavelength, in particular each with a different color. It is conceivable, for example, that emission location 31 emits light with a wavelength of 750 nm (red light) and that emission location 42 emits light with a wavelength of 380 nm (violet light). Accordingly, the light wavelength is shortened continuously from emission location 31 toward emission location 42 so that emission locations 32-41 emit light with wavelengths therebetween. For example, emission location 36 emits light with a wavelength of 580 nm.

The wavelengths can be distributed continuously or in discrete steps over emission locations 31-42. The steps can also be adapted to or switched on according to the requirements of the respective container topology to be processed.

While individual areas for emission locations 31-42 are shown purely graphically in FIGS. 3-5C, it is also conceivable, however, that the wavelength property of the emitted light for local encoding changes continuously along at least one direction $R_x$, $R_y$ of light-emitting surface 30. For example, the light-emitting surface can use a color gradient filter for emitting light with a color gradient that changes continuously in direction $R_y$, for example similar to the color gradient across a rainbow.

In order to record various emission locations 31-42 and to store them as location information in at least one camera image, camera 4 in this embodiment is configured as a color camera.

Figures 4A, 4B:
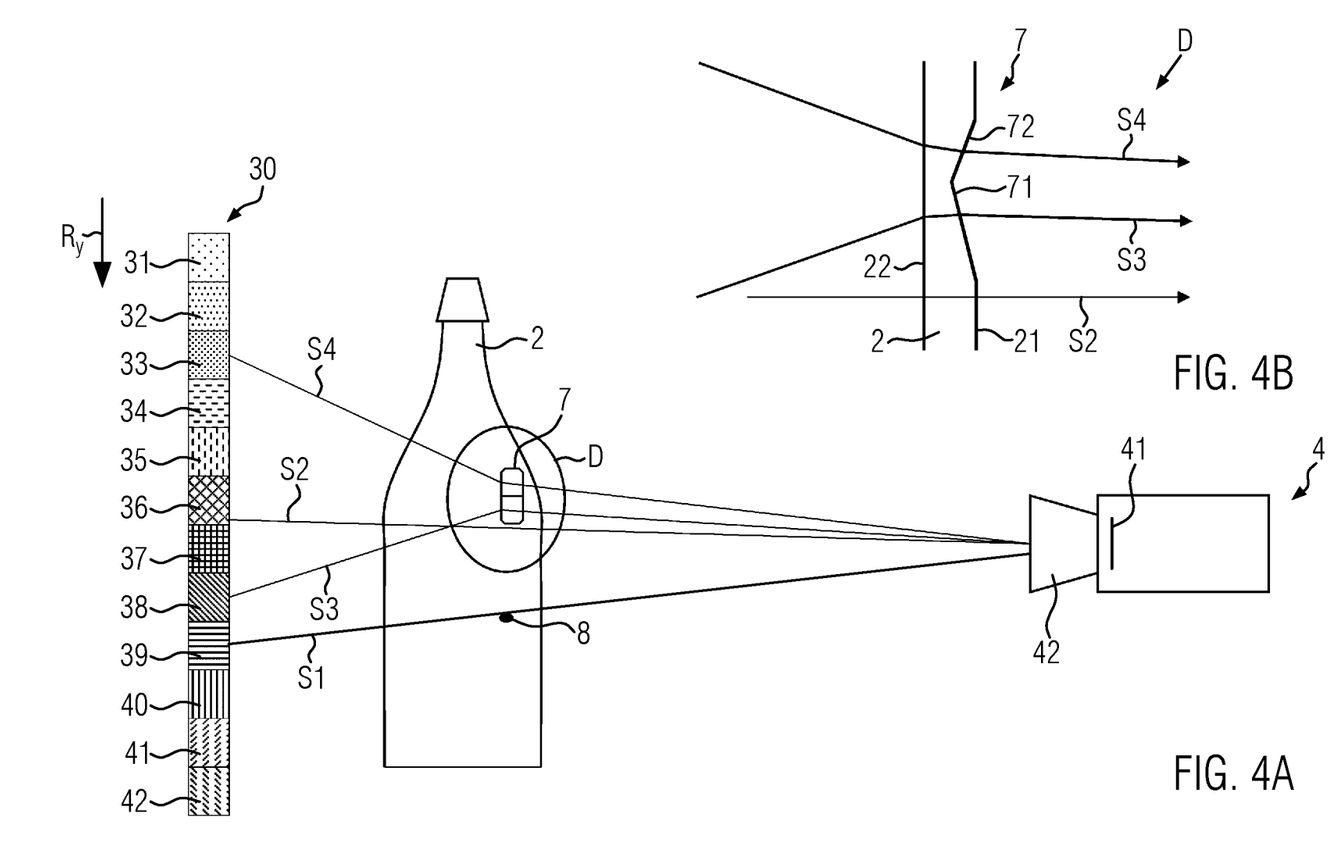
FIGS. 4A-4B show a lateral view of the light-emitting surface and the camera from FIGS. 2 and 3 during the inspection of a foreign object and a defect.

FIGS. 4A-4B show a lateral view of light-emitting surface 30 and camera 4 from FIGS. 2 and 3 during the inspection of a foreign object 8 and a defect 7. Detail D of FIG. 4A is shown in FIG. 4B.

Planar light-emitting surface 30 with various emitting locations 31-42 can be seen in a lateral profile. The light is emitted two dimensionally in the direction of camera 4 and then transilluminates container 2. Container 2 is presently made of, for example, transparent glass material so that the light is transmitted through container 2.

Camera 4 comprises image sensor 41 and lens 42 for recording container 2 in at least one camera image. It is conceivable that camera 4 is configured as a color camera with a Bayer filter.

Light beam S1 can also be seen, which, starting out from emission location 39, transilluminates container 2. It impinges foreign object 8, which absorbs part of its energy. Consequently, foreign object 8 in the at least one camera image of camera 4 appears having a reduced intensity as compared to its immediate surroundings. Due to the fact that the foreign object does not deflect light beam S1, it appears having the same wavelength property of emission location 39 as its immediate surroundings in the at least one camera image.

Light beam S2 can furthermore also be seen, which, starting out from emission location 36, transilluminates container 2 in the vicinity of defect 7. The light is there absorbed only to a small extent in dependence of the material of container 2 so that the respective image point in the at least one camera image appears having a high intensity and the wavelength property of emission location 36. As can additionally be seen in FIG. 4B, light beam S2 passes through container 2 at a point at which container inner wall 22 and container outer wall 21 run plane-parallel to one another. As a result, light beam S2 experiences only a slight offset depending on the angle of incidence, but no change in direction. As a result, the respective image point in the at least one camera image appears having a high intensity and the wavelength property of emission location 36.

In contrast, it can be seen in FIG. 4B that defect 7 comprises local notch areas 71, 72 on container outer wall 21. This can be, for example, a notch due to chipping. As a result, light beams S3, S4 are deflected at local notch areas 71, 72 by refraction. More precisely, light beam S3 is emitted from emission location 38 and, when passing through container 2 at first notch area 71, is deflected towards camera 4 by refraction of light. Starting out from the emission location 33, light beam S4 in contrast passes through container 2 and is deflected towards camera 4 at second notch area 72 by refraction of light. Due to the local refraction of light at notch areas 71, 72, defect 7 in the at least one camera image accordingly appears with wavelength properties that differ from the surroundings.

Figure 5A:
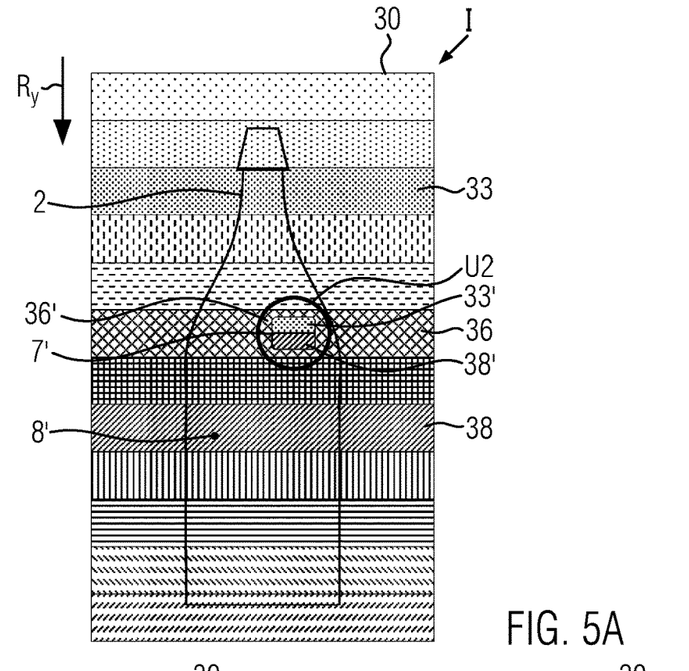
FIG. 5A shows the camera image during the inspection of the foreign object and the defect according to FIGS. 4A-4B on the basis of a wavelength property.

FIG. 5A shows in more detail a camera image I during the inspection of foreign object 8 and defect 7 on the basis of a wavelength property.

It can be seen that container 2 in camera image I appears in front of light-emitting surface 30. It can also be seen that foreign object 8 is mapped as a darkened, first local area 8'. In contrast, defect 7 is mapped as a second local area 7' with an intensity similar to that of the immediate surroundings, but it appears there in the upper region with location information 33' of emission location 33 and in the lower region with location information 38' of emission location 38 because the rays are locally deflected by defect 7, as is shown in FIG. 4A.

Due to the light emitted by light-emitting surface 30 being locally encoded on the basis of the wavelength property, emission locations 31-42 shown in FIGS. 3-4A are encoded with different wavelengths of the emitted light. For example, emission location 31 emits light with a wavelength of 750 nm (red light) and emission location 42 emits light with a wavelength of 380 nm (violet light). Accordingly, the light wavelength is shortened continuously from emission location 31 toward emission location 42 so that emission locations 32-41 emit light with wavelengths therebetween. For example, emission locations 33, 36 and 38 emit light with wavelengths of 680 nm (orange light), 580 nm (yellow light), and 510 nm (green light), respectively. Accordingly, pixels in second local area 7 are there present in orange in the upper half and green in the lower half, whereas surroundings U2 have predominantly yellow pixels.

Figure 5B:
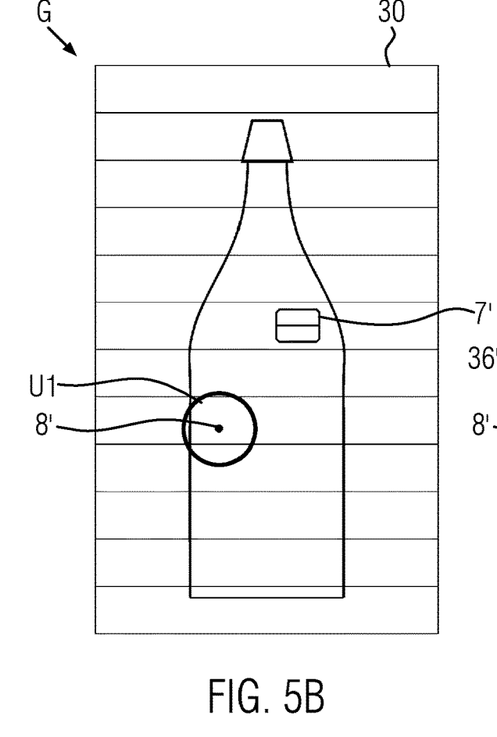
FIGS. 5B-5C show intensity channel G and color channel C of camera image I from FIG. 5A.
Figure 5C:
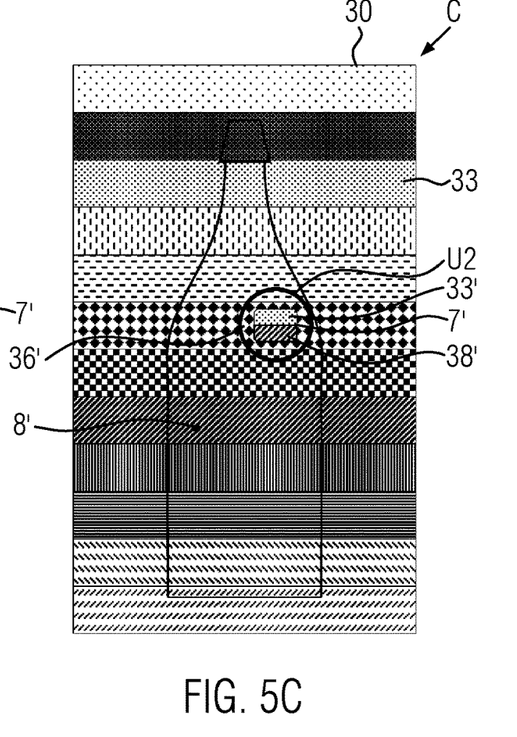

FIGS. 5B-5C show intensity channel G and color channel C of camera image I from FIG. 5A. Image processing unit 6 shown in FIG. 2 first divides camera image I shown in FIG. 5A into intensity channel G and color channel C. For example, camera image I is divided pixel for pixel on the basis of an HSV color model into respective brightness values in intensity channel G and color values in color channel C.

Image processing unit 6 subsequently evaluates intensity channel G of camera image I for first local area 8 with intensity information that differs from surroundings U1 in order to infer the presence of foreign object 8. This is done, for example, by way of a filter for detecting fluctuations in brightness.

Furthermore, image processing unit 6 evaluates color channel C of camera image I for second local area 7 with location information that differs from surroundings U2. As can be seen in FIG. 5C, local area 7' of defect 7 in the upper region appears with location information 33' (green) and in the lower region with location information 38' (orange). In contrast, immediate surroundings U2 have location information 36' of emission location 36 (yellow). Since second local area 7' therefore has a different location information 33', 38' than its surroundings U2, defect 7 can be distinguished from foreign object 8.

After the detection of foreign object 8 and/or defect 7, image processing unit 6 generates a signal that container 2 comprises foreign object 8 or defect 7. On the basis of the signal, a switch can be controlled, for example, for discharging respective container 2 for renewed cleaning or for recycling after the inspection.

Due to illumination unit 3 in the embodiments in FIGS. 1-5C being configured to emit the light, that is emitted from light-emitting surface 30 in a locally encoded manner on the basis of the wavelength property and due to camera 4 being configured to record the locally encoded light, it can be determined for the respective image points of the camera image from which of emission locations 31-42 the corresponding light component originates, regardless of the emission characteristics of light-emitting surface 30. Due to image processing unit 6 being configured to evaluate the at least one camera image for location information of emission locations 31-42, a defect 7 can be distinguished from a foreign object 8, for example, on the basis of a local change in emission location 33, 38. Conversely, the intensity information can still be evaluated for detecting particularly well the absorption of the light by foreign objects 7 with an emission characteristic of light-emitting surface 30 that is as diffuse as possible. Consequently, it is possible with method 100 and with device 1 according to the disclosure, respectively, to detect foreign objects 7 as well as defects 8 equally well with a single inspection unit 10. Less installation space is then required for this because this is done with a single inspection unit 10.

It goes without saying that features mentioned in the embodiments described above are not restricted to this combination of the features, but are also possible individually or in any other combination.

The invention claimed is:

1. A method for optically inspecting containers, where said containers are transported to an inspection unit with a illumination unit and with a camera, where said illumination unit emits light from a planar light-emitting surface, where the light is transmitted or reflected via said containers, where said camera records in at least one camera image at least one of said respective containers and the light transmitted or reflected via them, and where said at least one camera image is evaluated with an image processing unit for intensity information in order to detect foreign objects and/or defects of said containers, wherein the light emitted from said light-emitting surface is locally encoded on the basis of a wavelength property and is recorded by said camera in such a way that different emission locations of said light-emitting surface can be distinguished from one another in said at least one camera image, said image processing unit evaluates said at least one camera image for location information of said emission locations in order to distinguish said defects from said foreign objects, and said at least one camera image is divided into an intensity channel and a color channel using said image processing unit, where said image processing unit detects said foreign objects only on the basis of said intensity channel and said defects only on the basis of said color channel.

2. The method according to claim 1, where said wavelength property of the emitted light for local encoding changes continuously along at least one direction of said light-emitting surface.

3. The method according to claim 1, where the light from said light-emitting surface with said wavelength property is emitted varying locally so that said various emission locations are each encoded differently with said wavelength property, and where said camera records in the at least one camera image said locally varying wavelength property as said location information.

4. The method according to claim 1, where said image processing unit evaluates said at least one camera image for a first local area with intensity information that differs from that of a surroundings in order to infer a presence of a foreign object.

5. The method according to claim 4, where said image processing unit evaluates said at least one camera image for a second local area with location information that differs from the surroundings in order to infer the presence of a defect.

6. A device for optically inspecting containers comprising:

an inspection unit with an illumination unit and with a camera, an image processing unit for processing at least one camera image of said camera, a conveyor for transporting said containers to said inspection unit, where said illumination unit is configured to emit light with a planar light-emitting surface in order to illuminate and/or transilluminate said containers, where said camera is arranged at said inspection unit in such a way that it records in said at least one camera image at least one of said respective containers and light transmitted or reflected via them, where said image processing unit is configured to evaluate said at least one camera image for intensity information in order to detect foreign objects and/or defects of said containers, wherein said illumination unit is configured to emit the light from said light-emitting surface in a locally encoded manner on the basis of a wavelength property, said camera is configured to record the locally encoded light so that different emission locations of said light-emitting surface can be distinguished from one another in said at least one camera image, said image processing unit is configured to evaluate said at least one camera image for location information of said emission locations in order to distinguish said defects from said foreign objects, and said image processing unit is configured to divide said at least one camera image into an intensity channel and a color channel, and to detect said foreign objects only on the basis of said intensity channel and said defects only on the basis of said color channel.

7. The device according to claim 6, where said illumination unit is configured in such a way that said wavelength property of said emitted light for local encoding changes continuously along at least one direction of said light-emitting surface.

8. The device according to claim 6, where said illumination unit is configured to emit the light with said wavelength property differing in dependence of the location, and where said camera is configured to record said wavelength property in a spatially resolved manner.

9. The device according to claim 6, where said camera is configured as a color camera.

10. The device according to claim 6, where said illumination unit comprises at least one white light source and a color gradient filter for emitting the light from said light-emitting surface in a locally encoded manner.

11. The device according to claim 6, where said illumination unit comprises several different light sources which emit light spectra that differ from one another for emitting the light from said light-emitting surface in a locally encoded manner.

12. The device according to claim 11, wherein the several different light sources of the illumination unit are LEDs.

* * * * *